Oct. 12, 1965  W. C. McROBERTS  3,211,542
GLASS BENDING MOLDS
Filed April 24, 1963

INVENTOR.
WILLIAM C. McROBERTS
BY
Oscar L. Spencer
ATTORNEY

# United States Patent Office 3,211,542
Patented Oct. 12, 1965

3,211,542
GLASS BENDING MOLDS
William C. McRoberts, deceased, late of New Kennington, Pa., by Grace D. McRoberts, administratrix, Saxonburg, Pa., assignor to Pittsburgh Plate Glass Company, Pittsburgh, Pa., a corporation of Pennsylvania
Filed Apr. 24, 1963, Ser. No. 275,461
9 Claims. (Cl. 65—290)

This application is a continuation-in-part of application Serial No. 437,920, now abandoned, filed June 21, 1954.

This application relates to improved bending molds and specifically refers to improved bending molds of the female skelton type designed especially for bending irregularly shaped large sheets of flat glass. More specifically, the glass bending molds of the present invention are of the female skelton type comprising a rigidly supported center section and rotatable sections pivotally mounted on rigidly supported hinges for movement into an open mold position wherein the upper surfaces of said rotatable sections support a rigid, flat glass sheet above the center mold section and means tending to rotate the rotatable sections into a closed mold position as the glass softens to have the upper surfaces of the respective mold sections provide a continuous, skeletal frame or outline shaping surface conforming to the configuration desired for the bent glass sheet.

When a sheet of flat glass is laid upon a female type skelton mold (one having a concave elevation) in the open position, the flat glass forms a span between the outer extremities of the endmost sections of the mold. The recent increase in the size of bent windshields and backlights has necessitated bending very long flat glass sheets. When supported solely between the longitudinal mold extremities, these long flat glass sheets span such a long distance that the weight of the glass itself is sufficient in some cases to cause fracture. Additional intermediate support points have been provided on the inner extremities of the end sections of the mold to engage and support the undersurface of the flat glass as the latter is laid upon the open mold prior to bending.

The need to bend more complicated shapes of flat glass has introduced another problem in the design of glass bending moles, namely, the tendency for irregular shapes of glass to rotate or tilt about the axis defined by the points of support located at the longitudinal extremities of the mold. The rotational or tilting tendency has been avoided by providing support points in a horizontal plane for supporting flat glass sheets on both sides of a longitudinal axis passing through the center of gravity of the the flat sheet.

Prior art apparatus solving this problem have been characterized by a vertically movable center section and vertically movable hinges about which the rotating sections are pivoted. Downward movement of the center mold section and of the hinges as the mold closes increased the distance that central portion of the glass sheet had to sag before it came into contact with the center mold section. This factor increased the likelihood that the glass sheet would become misaligned with the mold shaping surface as it sagged from a flat to a bent configuration. The present invention further reduces the likelihood of glass sheet misalignment during its shaping by proposing a construction which minimizes the distance of sagging for the glass.

A female skeleton bending mold in present use with a support frame according to the present invention comprises a center section fixed in position relative to the support frame and two counterweighted end sections. The latter are each pivoted about a rigidly supported hinge axis to be rotatable into an open position to support a flat sheet of glass spanning the mold and rotatable into a closed position to provide with the center section a continuous skeletonized surface having the desired contour of the bent glass.

The rotatable end sections are so sized relative to the center section and hinged at such locations as to provide additional intermediate support for the glass sheet adjacent its longitudinal side edges to support the flat glass outside the normal area of vision for the fabricated bent glass sheet when the mold is open. This intermediate support is provided at the inboard extremities of the end sections. By this provision, the glass is prevented from tilting about its longitudinal axis and the length of its unsupported span is reduced considerably. A single intermediate support point may be sufficient for cetrain sizes and shapes of glass. However, for larger glass sheets, it is necessary that support points be provided at the inboard extremities on both sides of each end section.

The rigid support of the mold central section onto the mold support structure and the rigid attachment of the hinges to the rigid center section or the mold support structure enables the glass sheet to contact the shaping surface after sagging a relatively short distance compared to the distance needed by prior art sectionalized glass sheet bending molds to deposite a glass sheet on their vertically displaceable center mold sections. This reduces the likelihood that the glass sheet would become misaligned relative to the mold shaping surface during the bending operation.

One object of the present invention is to provide an improved method and apparatus for bending large sheets of glass wherein the glass sheets are supported intermediate their extremities before they are bent and are sagged a relatively short distance into complete contact with a mold shaping surface.

An additional object of the present invention is to provide apparatus for bending flat sheets of glass into curved shapes having a central major portion of curved contour of a relatively large radius merging into portions where the radius of curvature diminishes rapidly to form opposed edge portions of relatively shallow curvature in planes substantially perpendicular to the major central portion.

Another object of the present invention is to provide intermediate supports on at least one inboard extremity of a wing section of a concave glass bending mold to prevent the glass from tilting transversely of the mold while supported on the latter during bending.

Still another object of the present invention is to provide a bending mold carried by a mold support and having a central section rigidly supported by the mold support and rotatable end sections rotatably mounted on rigidly supported hinges. The hinges are so located that the inboard and outboard extremities of the end sections lie in a single horizontal plane when the mold is opened to support a flat sheet of glass as a beam, and the end sections rotate into a closed position in juxtaposition with the central mold section to form a substantially continuous skeletonized surface having the contour desired for the bent glass.

These and other objects of the invention will become obvious upon reading the following description in conjunction with the accompanying drawings.

Figure 1:
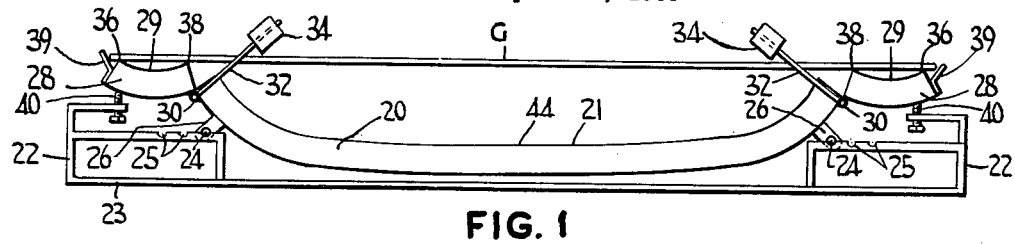
FIG. 1 is a side elevational view of one embodiment of the present invention showing the mold in an open position.

Referring to the drawings, the mold is provided with a fixed central section 20 comprising a pair of substantially horizontally disposed elongated shaping rails transversely spaced from one another, each of said shaping rails having an upper surface 21. The center section is rigidly supported by a suitable supporting frame 22. The latter is provided with a skeleton frame 23 and upper spaced notched support beams 25. Rods 24 fixedly secured by ears 26 to the mold section 20 rest in a notch 25, thus supporting the mold on the frame in fixed position.

End mold sections 28, having upper surfaces 29 formed on the upper edges of curved shaping rails, each extending around a longitudinal end of the mold and longitudinally inward thereof along its opposite longitudinal sides, are hinged to the outboard extremities of the fixed center section 20 at hinges 30. The latter comprises a fixed element rigidly attached to the fixed center section 20 and a rotatable element fixed to each end mold section 28.

A weighted lever arm 32 extending toward the center of the mold is attached to each end mold section 28 and is weighted at its inboard extremity. Weights 34 provide moments through lever arms 32 tending to rotate the end mold sections about hinges 30 to close the mold so that surfaces 29, 21 and 29 provide a continuous frame or shaping surface conforming to the shape desired for the bent glass in molding position.

The mold is cut and hinged at locations such that both the outer extremities 36 and the inner extremities 38 of the end mold sections 28 are in horizontal alignment above the upper surface 21 of the center mold section 20 when the end sections are pivoted into a position to receive flat glass for bending. Therefore, a sheet of flat glass G placed on the mold is supported at both the outer extremities 36 and the inner extremities 38 of the end mold sections 28. The flat glass placed upon the open mold should extend only slightly beyond each outer extremity 36 of the wings 28, about on the order of ¼ inch. Guide members 39 may be provided as necessary to determine the position of the glass on the open mold.

When the flat glass sheet is loaded properly on the open mold, its longitudinal edges are spaced a slight distance inwardly of the guide members 39 when the latter are used. The flat glass sheet rests as a beam upon extremities 36 and 38 of end mold sections 28 to hold the latter open by its weight.

Suitable stop members 40 are provided to insure that the wing sections open to the proper position wherein the extremities 36 and 38 of the end mold sections 28 lie in the desired horizontal plane. Failure to provide these stops may result in improper initial placement of the glass upon the mold, resulting in misalignment of the locations of the sharp bends longitudinally of the shaped sheets.

After the flat glass is mounted upon the open mold, the loaded mold is introduced into a bending lehr where the glass and the mold are gradually heated to prevent thermal shock. The glass may be heated to a greater degree in the zones of more extreme bends to facilitate bending in these zones.

As the glass softens, its central portions sags by gravity to conform to the upper surface 21 of the central section 20 of the mold. The moments provided by the weighted moment arms 32 rotate the end mold sections 28 upward to close the mold. The extremities of the softened glass are rotated from a horizontal plane toward a substantially vertical plane corresponding to the configuration of the surfaces 29 of end sections 28 of the mold.

The location of the cut points 42 and the hinges 30 is very important in providing proper support points for the flat glass. If the wings are cut from the main central portion at points too close to the mold extremities 36, the unsupported span of flat glass G is too long for the glass to resist fracture due to its own weight, especially when two or more sheets are bent simultaneously upon the mold.

The plane of the surface of the end mold sections 28 at their inboard extremities 38 should form a comparatively small angle with the plane of the flat glass. Unless this precaution is taken, the sharp edges at points 38 dig into the heat-softened glass causing mars. This criterion limits the inmost location of the cut points.

Another possibility resulting from a too centralized location of the inboard extremities 36 is the possibility of reverse sagging of the heat-softened sheet over the end sections due to the large unsupported wing span at each extremity of the glass. This localized sagging results in an increased tendency for the glass to kink at the points of contact between the glass and the inner extremities 38 of the end mold sections 28 when the size of the end mold sections 28 are increased, which kinks are difficult to remove upon subsequent heating and bending.

It is preferred that the hinge locations be so placed that the flat glass is as close as possible to the upper surface 21 of the center mold section 20 when the mold is in open position. The hinges 30 preferably are located so that each end section 28 provides a moment for closing the mold with a minimum weight required for the weighed lever arm 32. Simultaneously, the initial position at which the flat glass is placed upon the open mold should be maintained as close as possible to the lowermost point 44 of surface 21.

Locating the flat glass sheet in closed proximity to the central fixed portion enables the glass, when heated, to sag onto the latter with a minimum of relative sliding between the softened glass and the mold, which sliding causes marks to appear in the glass. The glass becomes fixed in position relative to the mold during the early stages of the bending cycle. Thus, when the end portions of the softened glass are rotated from a horizontal to a vertical position by the rotation of the end sections 28 during the latter stages of bending, relative movement between the mold in the glass, tending to misalign the latter, is reduced to minimum.

The size of the weights 34 and the length of the lever arms 32 are critical. The moments provided by the weighted lever arms 32 are required to be too small to rotate the end sections when flat glass sheets are mounted on the open mold, yet large enough to rotate the end mold sections plus a portion of the glass to the closed mold position after the glass sheet is heated-softened. This requirement permits the end section extremities to support the flat glass sheet as a beam when the mold is spread for loading an unbent glass sheet. A minimum of additional metal should be utilized for the weights and weighted lever arms, since the metal needed for the mold absorbs the radiant heat available for bending the glass. Therefore, the more metal that is used for the bending mold, the less efficiently is the bending lehr heat used to bend the glass.

Figure 2:
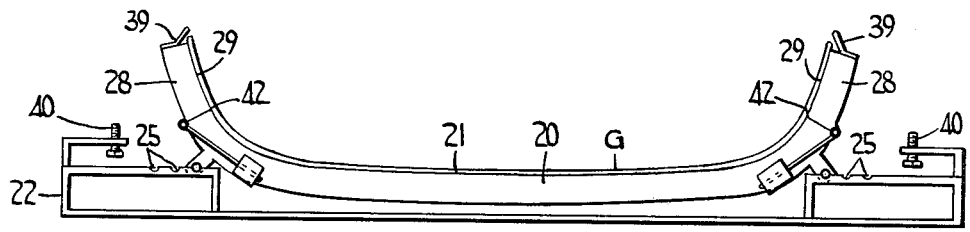
FIG. 2 is a view similar to FIG. 1 showing the mold in closed position.
Figure 3:
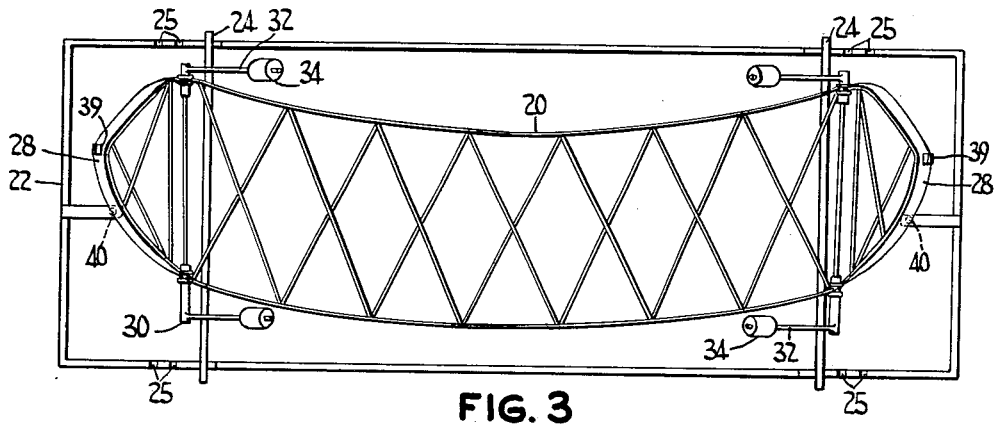
FIG. 3 is a plan view of the mold shown in FIG. 1.
Figure 4:
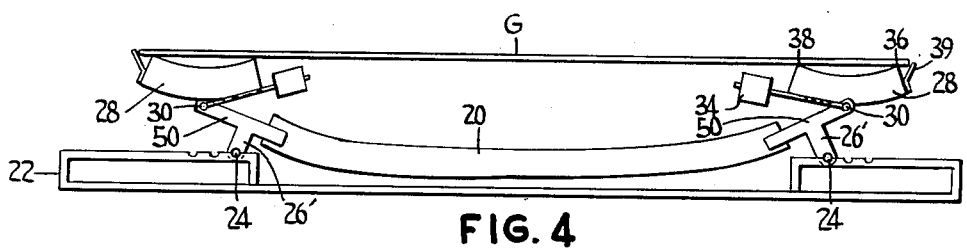
FIG. 4 is a side elevational view of another embodiment of the present invention showing the mold in open position.
Figure 5:
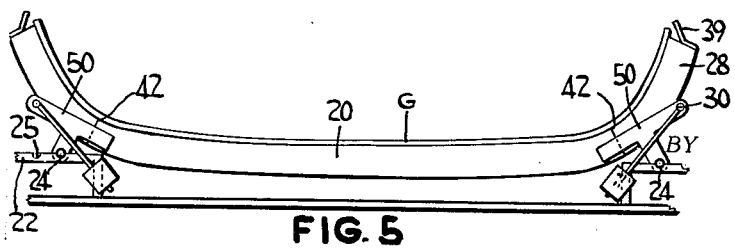
FIG. 5 is a view similar to FIG. 4 showing the latter mold in closed position.

The embodiment disclosed in FIGURES 1, 2, and 3 shows the hinges 30 located in alignment with the cut points 42. This particular configuration is optional. In most cases the arrangement shown in FIGURES 4 and 5 is preferred.

In the latter embodiment, the center mold section 20 is provided with outboard extensions 50 having ears 26' fixed to the support rods 24. Pivot rods 30 are journalled in fixed locations relative to the center mold section adjacent the outboard extremities of the extensions 50. In this embodiment, the end mold sections 28 may be so pivoted about hinges 30 that the weighted lever arms are not necessary since their centers of gravity disposed longitudinally inward to the rigidly supported hinges 30 may provide sufficient bending moments for rotating themselves into closed position. However, due to the desire to locate the flat glass in as low a vertical position relative to the fixed center section of the mold as possible, the hinge locations may of necessity be such that weights are required. Stop members for limiting the opening of the open mold may be provided in this embodiment as in the one previously described.

In both embodiments described herein, the hinge means 30 about which the end sections 28 pivot between the spread and closed mold positions are rigidly supported in fixed position relative to the mold support structure or the mold center section 20. This factor provides the mold with structural rigidity and helps minimize the likelihood of misalignment of the glass sheet relative to the mold shaping surface when the end sections are pivoting from the spread mold position to the closed mold position.

The term "cut points" as recited in the above description is intended to describe the locations at the extremities of the various mold sections where the sections are in juxtaposition when the mold is closed and is not intended to imply the manner of making the molds.

The form of the invention shown and described hereinabove represents some illustrative preferred embodiments thereof. It is understood that various changes may be made without departing from the spirit of the invention as defined by the claimed subject matter which follows.

What is claimed is:

1. Apparatus for bending glass sheets comprising a supporting frame; a skeleton mold having a center mold section, having a curved upper shaping surface, rigidly supported relative to said supporting frame, and movable end mold sections, each having a curved upper shaping surface and movable relative to the fixed center portion about hinge means fixed in position relative to said center mold section into a spread position for mounting a flat sheet of glass thereon and into a closed position wherein the center mold section and the end mold sections are in juxtaposition to form a substantially continuous skeletonized shaping surface; means operatively associated with the movable end mold sections for tending to move said movable end mold sections to the closed mold position; the center and end mold sections being so constructed and arranged that each end mold section supports the flat glass in a horizontal plane only at spaced points located at its inboard and outboard extremities in said spread position.

2. Apparatus as in claim 1, wherein said means operatively associated with said movable end mold sections comprises hinge means operatively associated with each end mold section and rigidly supported in fixed position relative to said supporting frame and a weighted lever arm attached to each end mold section to provide a net rotational force about said hinge means tending to rotate the end mold section into the closed mold position.

3. Apparatus as in claim 2, wherein said hinge means and weighted lever arms are constructed to produce rotational forces sufficient to apply upward lifting forces to the end mold sections too small to lift the entire glass sheet when the end mold sections are supporting a rigid glass sheet in their spread position, but sufficient to lift the extremities of the glass sheet after the latter has been heat-softened.

4. Apparatus as in claim 1, wherein said means operatively associated with said movable end mold sections comprises hinge means about which each end mold section is pivoted intermediate its inner and outer extremities, the hinge means and end mold section being so constructed and arranged that the latter is biased to pivot about the former to rotate toward the closed mold position.

5. Apparatus as in claim 1, wherein the shaping surface of the mold in its closed position is concave in elevation.

6. A glass bending mold as in claim 1, wherein the support points provided by the end mold sections are located on either side of a longitudinal axis passing through the center of gravity of the flat glass sheet.

7. Apparatus as in claim 1, wherein said hinge means about which each end mold section is pivoted is located longitudinally outward of the center of gravity of said end mold section.

8. Apparatus for bending glass sheets comprising a substantially horizontally disposed elongated center mold section, a pair of end mold sections mounted to pivot about substantially horizontal transverse axes relative to said center mold section, one of said end mold sections being located beyod one end of said center mold section and the other of said end mold sections being located beyond the other end of said center mold section, said mold sections having concave upper shaping surfaces conforming to the shape desired for different portions of a mold shaping surface, hinge means located longitudinally outward of each end of said center mold section and intermediate the inner and outer extremities of said end mold section for pivoting each of said end mold sections relative to said center mold section for pivotal movement between an open mold position and a closed mold position, said hinge means being located below the shaping surface of its associated end mold section in said open mold position, the inner end of the shaping surface of each end mold section pivoting into a position higher than the longitudinal extremities of the center mold section shaping surface and in horizontal alignment with the outer end of its shaping surface to support a flat glass sheet only at said inner and outer ends of said end mold section in nontilting relation in said open mold position and pivoting into a position adjacent the longitudinal extremity of said center mold section shaping surface and in alignment therewith to provide a substantially continuous shaping surface therewith conforming to the shape desired for the bent glass, said hinge means constituting the only pivotal connection for said end sections.

9. Apparatus for forming curved glass sheets by gravity bending while heated having two end sections and an elongated, horizontally disposed center section, each end section comprising a shaping rail extending at its outer end around a longitudinal end of the mold and longitudinally inward thereof along opposite longitudinal sides of the mold, said center mold section comprising a pair of substantially horizontally disposed elongated shaping rails transversely spaced from one another, hinge means connecting said end mold sections to said center mold section for pivoting said end mold sections between an open position and a closed molding position, each of said shaping rails having a concave upper surface that forms a different portion of an outline shaping surface formed by said mold, said upper surfaces of said shaping rails forming a substantially continuous mold shaping surface when said mold sections are in molding position, said hinge means being below the mold shaping surface portion provided by its associated end mold section shaping rail in said open mold position and longitudinally outward of the inner ends of the upper surfaces of said end section shaping rails, said hinge means being so disposed with respect to said mold sections that the outer ends of the upper surfaces of said end mold sections and the four inner ends of the upper surfaces of said end mold section shaping rails are movable to a glass supporting position where they are in horizontal alignment and higher than the upper surfaces of said center mold section shaping rails, said hinge means constituting the only pivotal connection for said end sections.

References Cited by the Examiner
UNITED STATES PATENTS

| | | | |
|---|---|---|---|
| 2,330,349 | 9/43 | Galey | 65—291 |
| 3,094,403 | 6/63 | Jendrisak | 65—288 |
| 3,103,430 | 9/63 | Jendrisak | 65—290 |

DONALL H. SYLVESTER, *Primary Examiner.*